(12) United States Patent
Dotan et al.

(10) Patent No.: US 8,677,472 B1
(45) Date of Patent: Mar. 18, 2014

(54) MULTI-POINT COLLECTION OF BEHAVIORAL DATA RELATING TO A VIRTUALIZED BROWSING SESSION WITH A SECURE SERVER

(75) Inventors: Yedidya Dotan, Tel Aviv (IL); Yael Villa, Tel Aviv (IL); Ayelet Levin, Pardes Hanna Karkur (IL); Boris Kronrod, Netanja (IL); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 127 days.

(21) Appl. No.: 13/246,457

(22) Filed: Sep. 27, 2011

(51) Int. Cl.
*H04L 29/06* (2006.01)
(52) U.S. Cl.
USPC .......................................................... 726/12
(58) Field of Classification Search
USPC .................................................... 726/12
See application file for complete search history.

(56) References Cited

U.S. PATENT DOCUMENTS

| | | | |
|---|---|---|---|
| 8,291,498 B1 * | 10/2012 | Liang et al. ................... | 726/24 |
| 8,356,352 B1 * | 1/2013 | Wawda et al. ................. | 726/22 |
| 2006/0143290 A1 * | 6/2006 | Dostert et al. ................. | 709/224 |
| 2007/0136579 A1 * | 6/2007 | Levy et al. .................... | 713/168 |
| 2010/0205436 A1 * | 8/2010 | Pezeshki ....................... | 713/168 |
| 2011/0246778 A1 | 10/2011 | Duane | |
| 2012/0042365 A1 | 2/2012 | Shoval et al. | |

OTHER PUBLICATIONS

Dotan, et al., "Uploading and Dowloading Unsecured Files Via a Virtual Machine Environment," U.S. Appl. No. 13/077,103, filed Mar. 31, 2011.

* cited by examiner

*Primary Examiner* — Jason Gee
(74) *Attorney, Agent, or Firm* — BainwoodHuang

(57) ABSTRACT

A method of operating a VM server (VMS) is described, including (a) executing a VM instance (VMI) at the VMS, the VMI having a remote display within a terminal program of a client computer, the terminal program being configured to send commands received by the client from a user to the VMS to affect operation of the VMI, (b) running a browser within the VMI, the browser having a connection to a secure web application running on a web application server, the commands sent from the terminal program to the VMS allowing the user to interact with the web application via the terminal program and the browser running on the VMI, (c) at the VMS, asynchronously collecting information in connection with the commands sent from the user to the VMS, and (d) at the VMS, asynchronously sending the collected information to an analysis server to be analyzed for anomalous behavior.

21 Claims, 5 Drawing Sheets

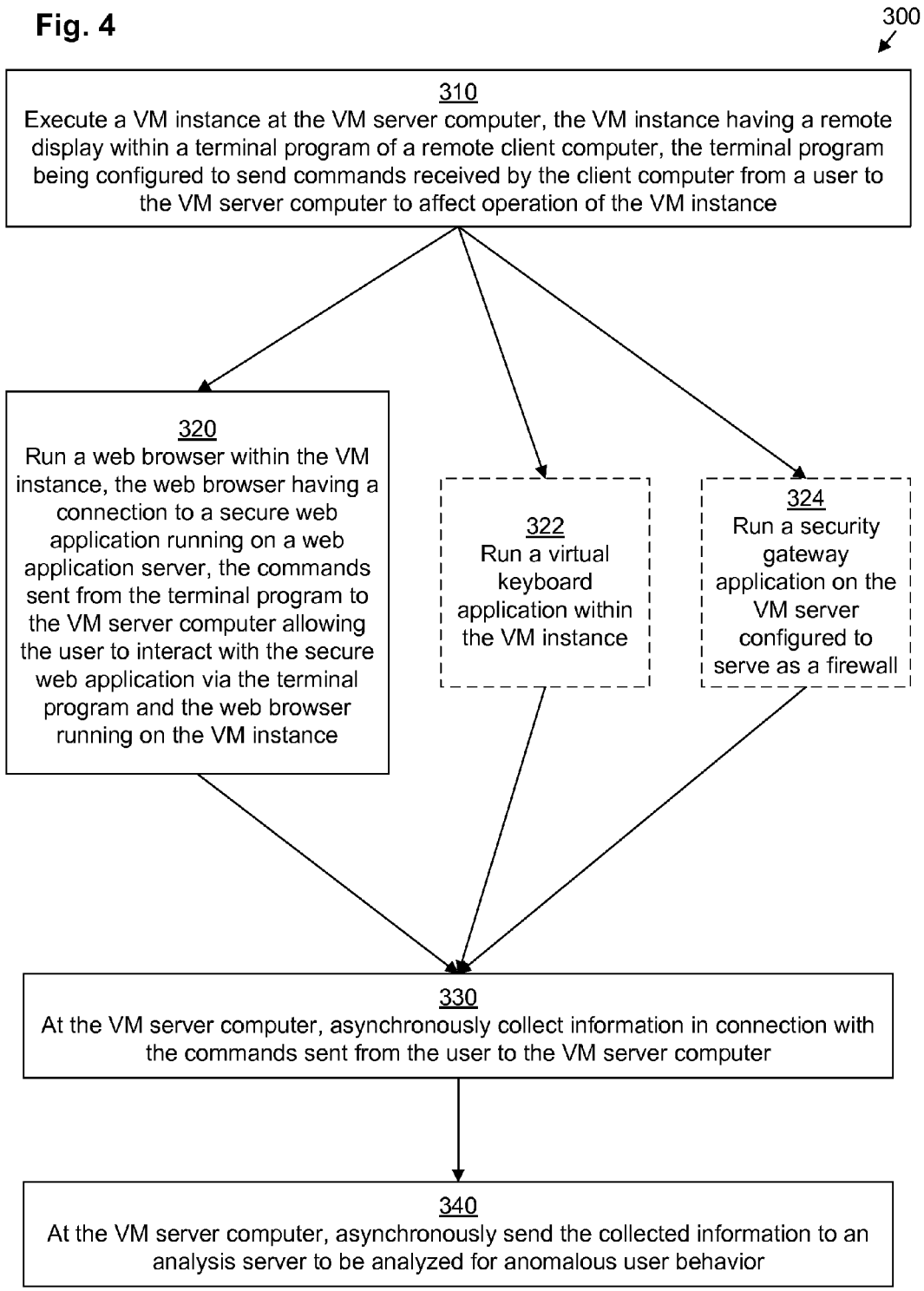

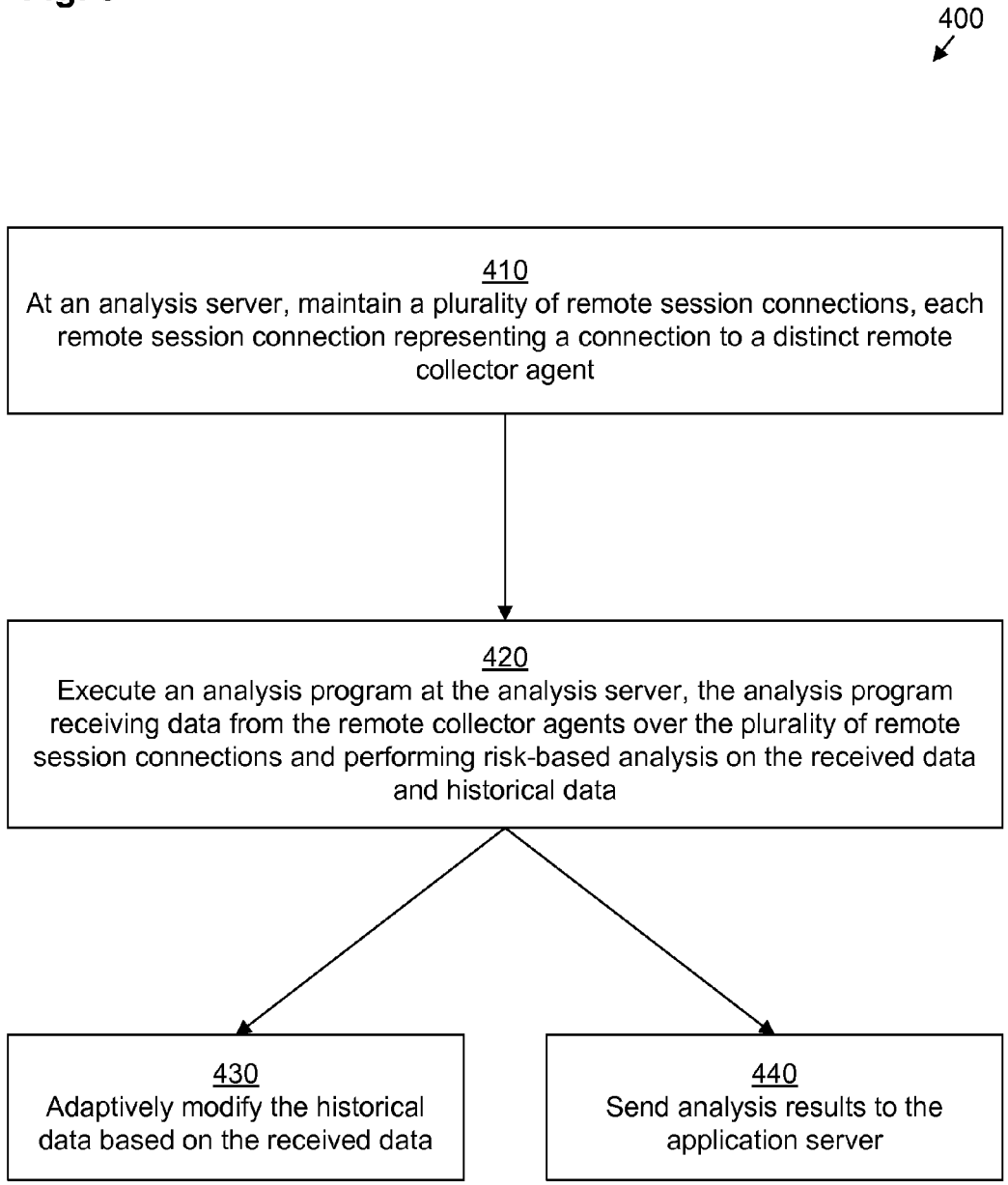

MULTI-POINT COLLECTION OF BEHAVIORAL DATA RELATING TO A VIRTUALIZED BROWSING SESSION WITH A SECURE SERVER

BACKGROUND

Malicious software (malware) is currently a serious threat to both commercial and retail online banking. As many as one in four computers in the U.S. is infected by malware. The malware most relevant to online banking fraud are of the Trojan horse variety (Trojans). These install themselves on user machines and then may enable a controller to record data from an infected machine (e.g., key loggers), listen in on conversations (e.g., Man in The Middle or MiTM), or even hijack a session from within a browser (e.g., Man in The Browser or MiTB).

Trojans, as their name implies, are not perceived by the user. They are able to record keyboard entries at given web sites, and thereby steal the users' userIDs and passwords. They are also able to change transactions as they occur, thus the user may think he is performing a legitimate transaction (e.g., paying a bill) but in reality he is sending money to an offshore account. Trojans also allow session hijacking, whereby a remote fraudster performs transactions via the user's infected machine.

This invisible presence allows Trojans to circumvent most current strong authentication models (e.g. one time passwords and certain out of band interactions). In particular, it may be possible for a fraudster to use Trojans both to steal credentials and clean out accounts. For example, in a MiTB attack, a fraudster may use a key logger to steal the user identifier (and, sometimes the confidential password) from a bank and hijack the individual's account by secretly altering user transactions while presenting fictitious transaction confirmation data to the user. Furthermore, the fraudster may take over user's account and clean out his checking account.

SUMMARY

It would be desirable to allow the user to securely communicate with the online banking site without being threatened by malware running on the user's machine. Therefore, in some embodiments, users work from a secure virtual environment, taking the form of a disposable virtualized browser environment, which prevents direct interaction between the malware and the online banking site. Such operation protects users from identity theft and misuse of credit information by malware operating in the user's machine. Furthermore, it would be desirable to operate the disposable virtualized browser environment in conjunction with a behavioral analysis service to analyze actions performed via the online banking site to further ensure that an imposter is not impersonating the user. Thus, techniques are described for monitoring activity at various nodes of the virtualized browser environment and sending activity data to a central behavioral analysis server from various nodes. Thus, additional confidence is provided that the user is not being impersonated.

In one embodiment, a method of operating a virtual machine (VM) server computer is described. The method includes (a) executing a VM instance at the VM server computer, the VM instance having a remote display within a terminal program of a remote client computer, the terminal program being configured to send commands received by the client computer from a user to the VM server computer to affect operation of the VM instance, (b) running a web browser within the VM instance, the web browser having a connection to a secure web application running on a web application server, the commands sent from the terminal program to the VM server computer allowing the user to interact with the secure web application via the terminal program and the web browser running on the VM instance, (c) at the VM server computer, asynchronously collecting information in connection with the commands sent from the user to the VM server computer, and (d) at the VM server computer, asynchronously sending the collected information to an analysis server to be analyzed for anomalous behavior by the user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 illustrates an example method according to various embodiments.

FIG. 5 illustrates an example method according to various embodiments.

DETAILED DESCRIPTION

Techniques are described herein for monitoring activity at various nodes of a web session operated over a virtualized browser environment and sending activity data to a central behavioral analysis server from the various nodes.

Figure 1:
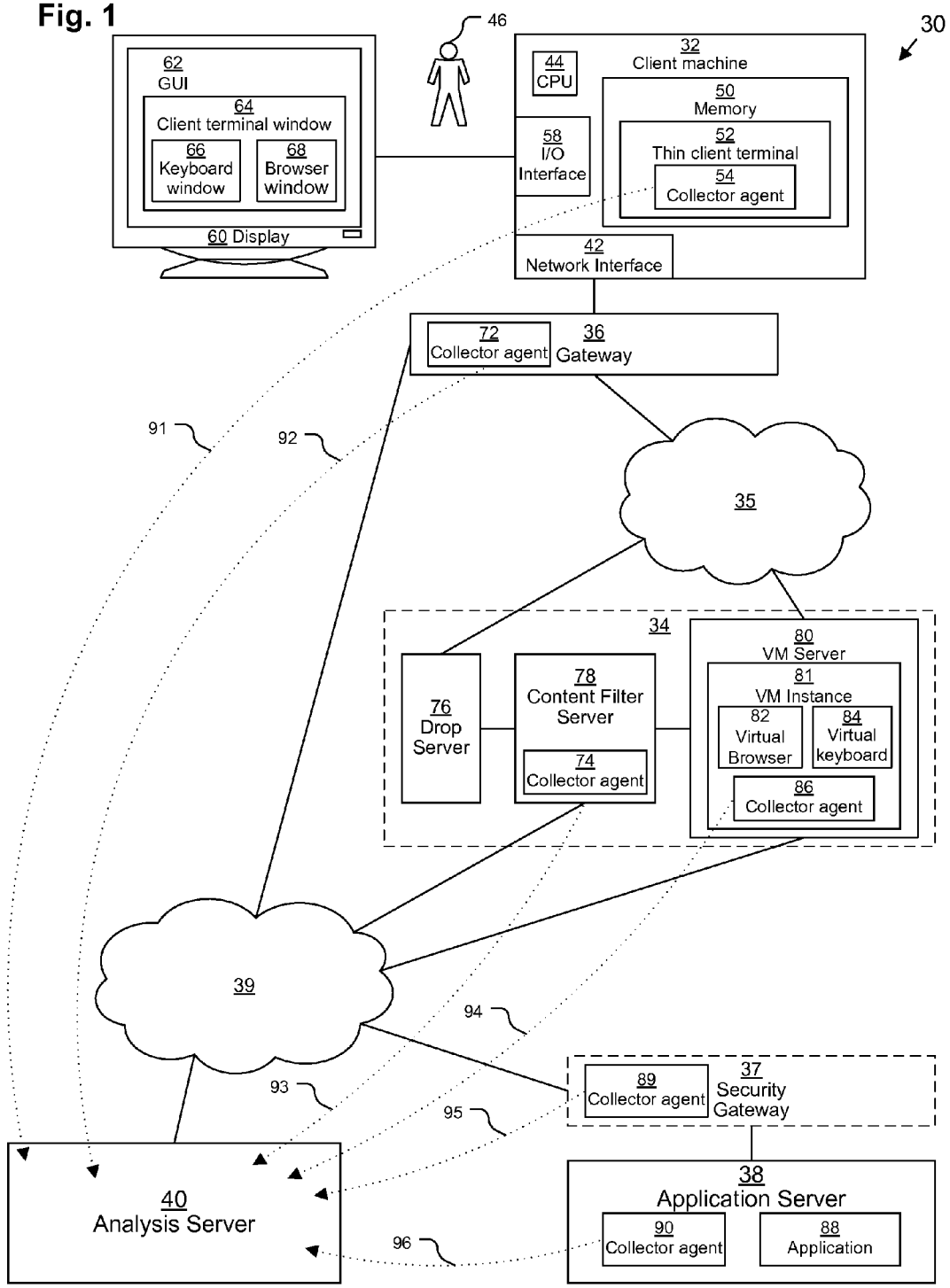
FIG. 1 illustrates an example system according to various embodiments.

FIG. 1 illustrates an example system 30 according to various embodiments. System 30 includes a client machine (or client-side computing device) 32 connected to an intermediate system 34 via gateway 36. Client machine 32 may be, for example, a personal computer or a web-enabled tablet or telephone. Client machine 32 remotely connects to gateway 36 over a network, such as, for example, the Internet. Gateway 36 connects to intermediate server 34 over a network 35, such as, for example, a wide area network (WAN), a local area network (LAN), a point-to-point connection, etc. Intermediate system 34 connects to an application server 38 and a behavioral analysis server 40 over a network 39, such as, for example, a WAN, a LAN, a point-to-point connection, etc. Gateway 36 also connects to behavioral analysis server 40 over network 39, such as, for example, a WAN, a LAN, a point-to-point connection, etc. It should be understood that, in some embodiments, networks 35, 39 are the same, while in other embodiments, they are distinct. In some embodiments, a security gateway 37 may interpose between application server 38 and network 39. In some embodiments, network 39 also connects to an authentication server (not depicted).

Client machine 32 includes a network interface 42 for connecting to gateway 36, a central processing unit (CPU) 44, memory 50, and an input/output (I/O) interface 58. CPU 44 may be, for example, a processor, a microprocessor, a collection of multiple processors or microprocessors, or dedicated circuitry. It should be understood that the term "CPU" may include these examples whenever used within this description. Memory 50 may include any type of volatile or non-volatile storage, such as, random access memory, read-only memory, volatile memory, non-volatile memory, flash memory, magnetic storage, optical storage, or any combination thereof. It should be understood that the term "memory" may include these examples whenever used within this description. Memory 50 stores one or more computer programs constituting instructions to be performed by CPU 44. One such computer program stored within memory 50 is a thin client terminal 52 (for providing a remote virtual machine (VM) interface, as will be described in further detail below), which is executed by CPU 44. Memory 50 also stores data used by client terminal 52. Memory 50 may also store a drop client program (not depicted) and a file-transfer-protocol (FTP) service (not depicted), both of which may be executed by CPU 44. Memory 50 may also store other well-known elements, such as, for example, an operating system, system settings, and user data (all not depicted). I/O interface 58 connects to display device 60. I/O interface may also connect to one or more input devices, such as, for example, a keyboard, keypad, mouse, trackpad, trackball, touch-sensitive device, or any similar devices (all not depicted) for receiving input from a user 46.

Display 60 presents a graphical user interface (GUI) 62 to user 46. GUI 62 displays a client terminal VM instance window 64 which displays the output of client terminal 52. Client terminal VM instance window 64 may display a virtualized keyboard window 66 (whose use will be described in further detail below) and a virtualized browser window 68, which, for example, appears as the front-end interface of a web browser for displaying web pages. In some arrangements, virtualized keyboard 66 appears within client terminal VM instance window 64 only when browser window 68 displays certain web pages.

Intermediate system 34 includes a drop server 76, a content filter server 78, and a VM server 80. In some embodiments, each of the drop server 76, the content filter server 78, and the VM server 80 are separate machines, which connect to each other via connections, such as, for example a WAN, a LAN, a point-to-point connection, etc. These connections may be part of network 35 or network 39 or they may be entirely separate. In some embodiments, drop server 76 and VM server 80 both connect to gateway 36 to allow direct communication with client machine 32, while content filter server 78 and VM server 80 both connect to application server 38 and behavioral analysis server 40 to allow direct communication therebetween. VM server 80, which is described in further detail below, in connection with FIG. 2, runs a VM instance 81 (which renders on display 60 as client terminal VM instance window 64), which includes a browser 82 (which renders on display 60 as browser window 68), and a virtual keyboard 84 (which renders on display 60 as virtualized keyboard 66). In some embodiments, each of drop server 76, content filter server 78, and VM server 80 are software programs operating on a single intermediate system server 34.

It should be understood that although FIG. 1 shows exactly one each of the drop server 76, content filter server 78, and VM server 80, in some embodiments there may be multiple instances of each server, while in other embodiments, some of these servers may be omitted. Furthermore, some of these servers may be replaced with various combinations of other devices that perform similar tasks. It should also be understood that, in some embodiments, drop server 76 and content filter server 78 may be omitted entirely.

Optional security gateway 37 may serve as a firewall preventing intermediate system 34 and gateway 36 from accessing application server 38 or any other remote device (such as, for example, over the Internet) without certain checks. In some embodiments, security gateway 37 may blacklist certain remote servers in certain modes of operation. In some embodiments, security gateway 37 may whitelist certain remote servers in certain modes of operation. In some embodiments, security gateway 37 may allow or disallow upload to or download from certain remote servers in certain modes of operation.

Various collector agents 54, 72, 74, 86, 89, 90 may run on the client machine 32, gateway 36, content filter server 78, VM server 80, security gateway 37, and application server 38, respectively. Collector agents 54, 72, 74, 86, 89, 90 may send activity messages 91, 92, 93, 94, 95, 96, respectively, to behavioral analysis server 40. It should be understood that although several collector agents 54, 72, 74, 86, 89, 90 are depicted, fewer of these than depicted may actually be used in any given embodiment.

Application server 38 runs an application 88. Application 88 may be, for example, a secure web-based financial services application (e.g., an online banking application) that communicates with a user 46 of client machine 32 via browser 82, running on VM server 80 in a virtualized manner, rendered web pages of the application 88 appearing within the browser window 68 on display 60. Application server 38 may also include other well-known elements, such as, for example, an operating system, system settings, and user data.

In one example mode of operation, a client machine 32 may request establishment of a virtual machine instance 81 running on VM server 80 to allow for secured communications between client machine 32 and application 88 via the VM server 80. Application 88 sends web pages to browser 82, which renders the web pages as images and sends the rendered images to be remotely displayed in browser window 68. The user 46 is able to see the rendered web page images and interact with the application 88 by clicking on portions of the web page images displayed in browser window 68 and by clicking on keys of the virtualized keyboard 66, which are interpreted as keystrokes by virtual keyboard 84 to be sent to application 88. In some embodiments, user 46 is able to directly enter keystrokes by typing on a physical keyboard connected to I/O interface 58, the virtualized keyboard 66 and virtual keyboard 84 not being used in these embodiments. Various data associated with these actions may be collected by collector agents 54, 72, 86, 89, 90 and sent to behavioral analysis server 40 over activity messages 91, 92, 94, 95, 96, respectively.

In one example mode of operation, a client machine 32 may request establishment of a virtual machine instance 81 running on VM server 80 to allow for secured communications between client machine 32 and application 88 via the VM server 80. If user 46 of the client machine 32 wishes to send a local file to application 88, the user bypasses the virtual session by sending the local file to the drop server 76, using for example, locally-running FTP service. Content filter server 78 then pulls the content file from the drop server 76, filters it (e.g., by scanning it for malware and/or by converting it to a standardized safe format), and sends the filtered file to VM server 80, or, in some embodiments, directly to application server 38. Once VM server 80 has received the filtered file, the user is able to see that the filtered file is available within browser 82 (depicted within browser window 68) to send to application 88. Various data associated with these actions may be collected by collector agents 54, 72, 74 and sent to behavioral analysis server 40 over activity messages 91, 92, 93, respectively.

In another example mode of operation, a client machine 32 may request establishment of a virtual machine instance 81 running on VM server 80 to allow for secured communications between client machine 32 and application 88 via the VM server 80. If user 46 of the client machine 32 wishes to download a remote file from application 88 to client machine 32, the user 46 uses the browser 82 (via browser window 68) to request the remote file from the application 88. Application server 38 sends the remote file 94 to the VM server 80. Content filter server 78 then pulls the remote file from the VM server 80, filters it (e.g., by scanning it for malware and/or by converting it to a standardized safe format), and sends the filtered remote file to drop server 76. Drop server 76 is then able to send the filtered remote file to the client machine 32 for storage using for example, locally-running FTP services. Various data associated with these actions may be collected by collector agents 54, 72, 74, 89, 90 and sent to behavioral analysis server 40 over activity messages 91, 92, 93, 95, 96, respectively.

Figure 2:
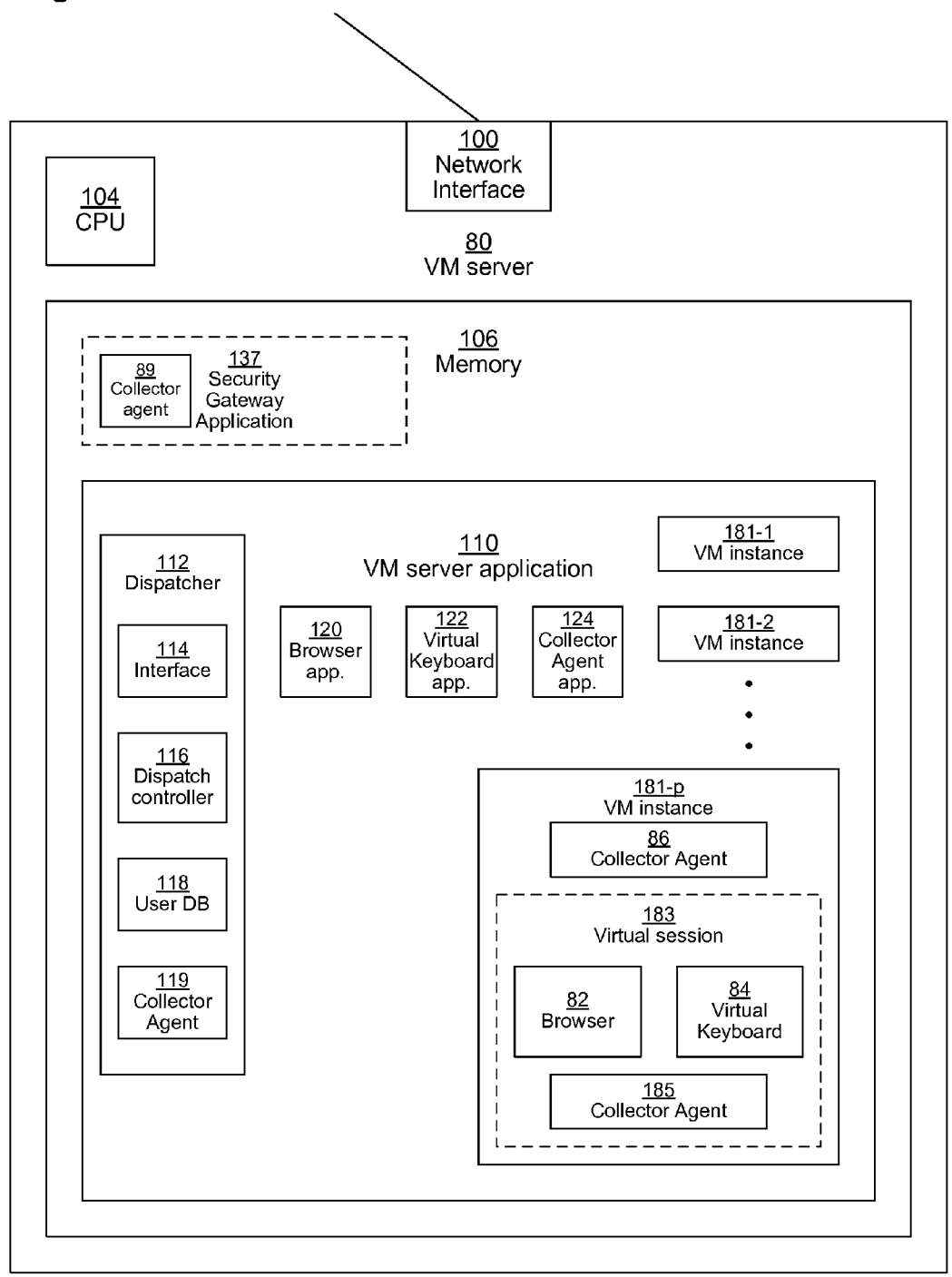
FIG. 2 illustrates an example apparatus according to various embodiments.

FIG. 2 depicts an example VM server 80 in further detail. As depicted, VM server 80 is a computer having a network interface 100 for connecting to gateway 36, application server 38, and behavioral analysis server 40 (and, in some embodiments, to content filter server 78), a CPU 104, and memory 106. Memory 106 stores a VM server application 110, which runs on CPU 104, as well as an FTP service (not depicted) and various other well-known elements, such as, for example, an operating system, system settings, and user data (all not depicted). In some embodiments, such as, for example, when optional security gateway 37 does not physically interpose between application server and machines 34, 36, 40, memory 106 also stores a security gateway application 137, which also runs on CPU 104. Security gateway application 137 has similar functionality as security gateway 37 described above, and collector agent 89 may run therein.

VM server application 110 may communicate with thin client terminal 52 according to any appropriate remote protocol, including, but not limited to, Remote Desktop Protocol, xrdp, X Window System, Remote Framebuffer Protocol, or Virtual Network Computing, which are well-known in the art. In some embodiments, thin client terminal 52 communicates with gateway 36 using a secure transport protocol, such as, for example, HTTPS or SSL, encapsulating remote protocol packets, and gateway 36 is responsible for decapsulating the remote protocol packets from the secure transport protocol upon receiving packets from client machine 32 and for encapsulating the remote protocol packets within the secure transport protocol upon receiving packets from the VM server 80 targeted towards the thin client terminal 52. In some embodiments, gateway 36 also authenticates certificates to allow the remote protocol to be used between the thin client terminal 52 and the VM server 80.

VM server application 110 includes a dispatcher module 112, secure browser application 120, virtual keyboard application 122, collector agent application 124, and a set of VM instances 181 (depicted as VM instances 181-1, 181-2, . . . , 181-p). Dispatcher module 112 controls the establishment and maintenance of VM instances 181. Within dispatcher module 112, interface 114 communicates with client terminal 52 (running on client machine 32), content filter server 78, and application 88 (running on application server 38). Once a VM instance 181-p has been established with reference to per-user pre-configured settings stored in user database 118, dispatch controller 116 runs an instance 82 of browser application 120 in the context of that VM instance 181-p to allow the user 46 of VM thin client terminal 52 to communicate with application 88. Dispatch controller 116 also instantiates virtual keyboard application 122 as virtual keyboard 84 within VM instance 181-p and collector agent application 124 as collector agent 86 within VM instance 181-p. VM instance 181-p may also include a set of filtered files (not depicted) received from content filter server 78 in association with a particular user. In some embodiments, browser 82 and virtual keyboard 84 operate within the context of a single application-layer virtual session 183, which may also include an additional session-level collector agent 185. In some embodiments, an additional server-level collector agent 119 runs within dispatcher 112. Further details with respect to collector agents 119, 185 will be provided below.

Figure 3:
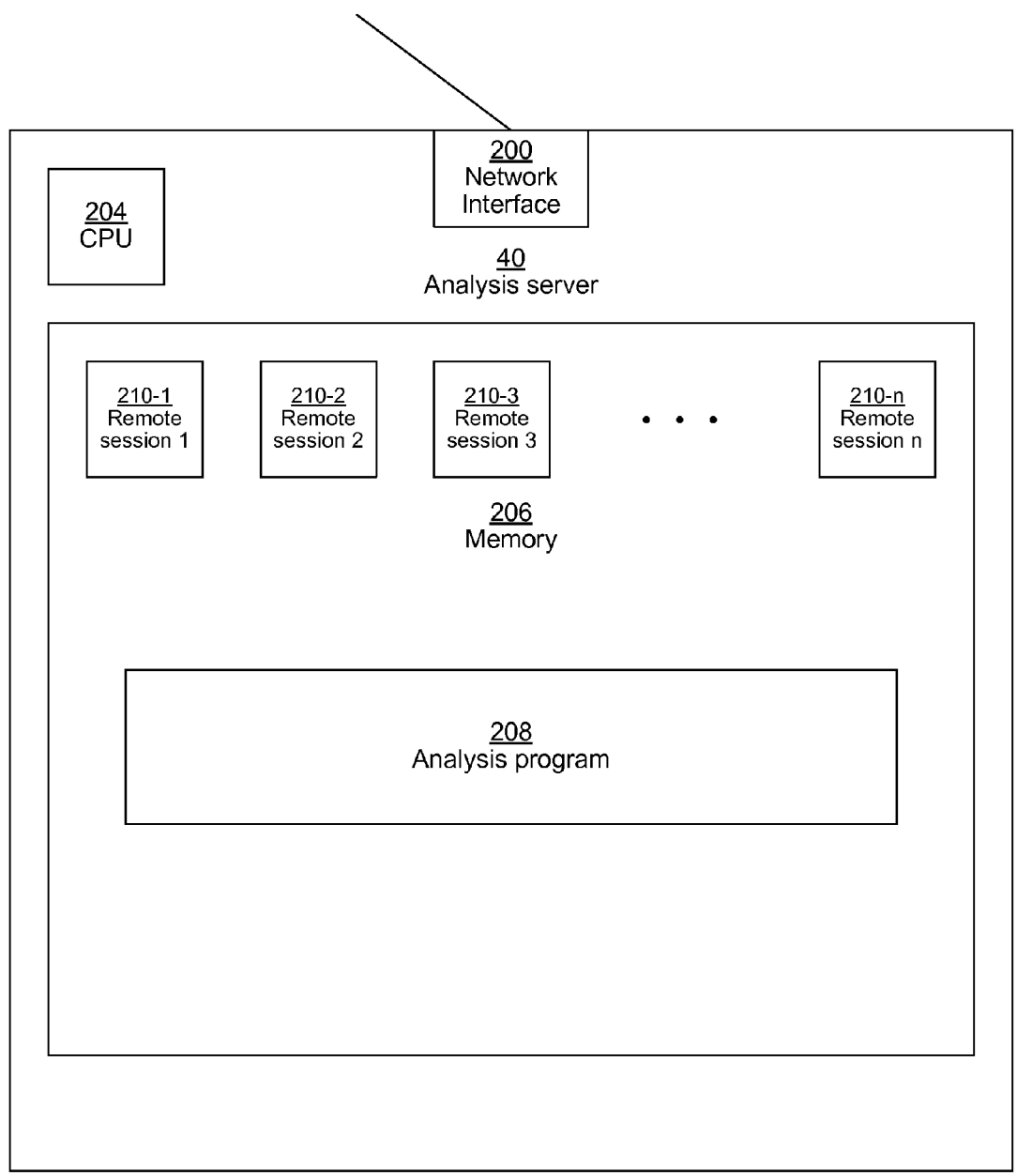
FIG. 3 illustrates an example apparatus according to various embodiments.

FIG. 3 depicts an example behavioral analysis server 40 in further detail. As depicted, behavioral analysis server 40 is a computer having a network interface 200 for connecting to network 39 (in some embodiments, via security gateway 37), a CPU 204, and memory 206. Memory 206 stores a behavioral analysis program 208, which runs on CPU 204. In some embodiments, behavioral analysis program 208 provides results that generate recommendation to the system to perform adaptive second factor authentication, such as, for example, using the RSA Adaptive Authentication platform produced by the EMC Corp., based in Hopkinton, Mass. In some embodiments, memory 206 also maintains a set of remote session connections 210-1, 210-2, 210-3, . . . , 210-n, each remote session connection 210 representing a connection to one of various remote collector agents 54, 72, 74, 86, 89, 90, 119, 185 accessible by behavioral analysis program 208.

FIG. 4 depicts an example method 300 performed by VM server 80. In step 310, VM server computer 80 executes a VM instance 181-p within VM server application 110 as described above in connection with FIGS. 1 and 2. In particular, dispatch controller 116 may dispatch or launch VM instance 181-p. User 46 is able to interact with VM instance 181-p by performing various mouse/cursor actions and keystrokes via I/O interface 58, which cause terminal program 52 to send underlying user commands to the VM server application 110 to affect operation of the VM instance 181-p.

In step 320, dispatch controller 116 launches an instance of web browser application 120 as web browser 82 within VM instance 181-p, particularly within the context of application-layer virtual session 183. Web browser 82 causes browser window 68 to be displayed within client terminal window 64. The various user commands referenced in connection with step 310 allow the user 46 to interact with remote application 88 via thin client terminal 52 and web browser 82.

In optional step 322, which may be performed in parallel with step 320, dispatch controller 116 runs an instance of virtual keyboard application 122 as virtual keyboard 84 within VM instance 181-p, particularly within the context of application-layer virtual session 183. Virtual keyboard 84 causes virtualized keyboard window 66 to be displayed within client terminal window 64. The various user commands referenced in connection with step 310 allow the user 46 to virtually type keystrokes on the virtualized keyboard 66. Virtual keyboard 84 receives user click coordinates over particular graphical key buttons of the virtualized keyboard 66, converts the user click coordinates into keystrokes associated with the particular key buttons, and sends the keystrokes to the web browser 82.

In optional step 324, which may be performed in parallel with step 320, VM server computer 80 runs security gateway application 137 separately from VM server application 110. Security gateway application 137 serves as a software firewall, preventing VM server application 110 from engaging in certain prohibited behaviors with application server 38. It should be understood that in some embodiments, the functionality of step 324 may instead be performed by security gateway 37.

In step 330, VM server computer 80 asynchronously collects information in connection with the user commands referenced in connection with step 310. Information is referred to as being collected "asynchronously," when its collection does not interfere with operation of application 88 in communication with user 46—that is, regardless of what information is asynchronously collected, the application 88 receives and processes the user commands without delay. Step 330 may be performed by one or more of the collector agents 86, 89, 119, 185 running on VM server 80.

Collector agent 185 may collect information at a session-level by monitoring communications received by the application-layer virtual session 183 and extracting specific types of information from the monitored communications. In some embodiments, monitoring communications received by the application-layer virtual session 183 may include receiving cursor data provided by the thin client terminal 52, the cursor data indicating when and where the user 46 clicked (e.g., using a mouse) and hovered a cursor within the terminal window 64.

In one embodiment, if the collector agent 185 is further configured to capture rendered web pages (sometimes referred to as "screen scraping") produced by the virtual web browser 82 when the user 46 clicks within the terminal window 64, collector agent 185 is then able to combine the cursor data and the rendered web pages to extract timed user action sequences in response to the web browser 82 displaying particular web pages. For example, one particular web page might be a "set up payment" page on which the user 46 is directed to choose an account from which to make a payment and then click a "Continue" button to continue on to a subsequent page to enter additional details. In response to the web browser 82 displaying the "set up payment" page, the cursor data might indicate that the user 46 clicked at location (x1, y1) corresponding to a radio button associated with a particular account t1 seconds after loading the page, then hovering the cursor over location (x2, y2) corresponding to the "Continue" button between times t2 and t3, and then clicking at location (x2, y2) corresponding to the "Continue" button at time t4. The extracted timed user action sequence would then indicate that the user 46 selected the particular account after a delay of t1 seconds, hovered over the "Continue" button for t3-t2 seconds, and then finalized the selection after a total delay of t4 seconds. This timed user action sequence could ultimately be analyzed by the behavioral analysis server 40 using bio-rhythm analysis and vitality detection analysis to determine if the timed user action sequence is consistent with past habits of the user 46 (as opposed to an imposter) and if the timed user action sequence is consistent with a human operator.

As an additional example, in another embodiment, collector agent 185 combines cursor data and keystroke data received from virtual keyboard 84 to extract timed user keystroke sequences which could ultimately be analyzed by the behavioral analysis server 40 using bio-rhythm analysis and vitality detection analysis. For example, when virtual web browser 82 loads a page for the user 46 to set up a destination account for future payments, the user 46 may enter text into a text box on the web page, the text indicating the account number of the destination account. The speed at which the user 46 enters the account number and the number of mistakes corrected by the user 46 by hitting "delete" or "backspace" may be relevant in determining if the text is being entered by a human consistent with patterns associated with the expected user.

Collector agent 86, operating as a module of a VM instance 181, may collect information at an instance-level by monitoring the user commands referenced in connection with step 310 and extracting specific types of commands from the received commands. For example, the specific types of commands may include mouse clicks and cursor hovers and movements within browser window 68 and virtualized keyboard window 66. In some embodiments, collector agent 86 may be configured to collect the same data as collected by collector agent 185, such as timed user action sequences and timed user keystroke sequences. Since collector agent 86 runs outside of virtual session 183, collector agent 86 may not have access to all of the processed data exchanged among web browser 82, virtual keyboard 84, and thin client terminal 52. In order to acquire this data, collector agent 86 may need to emulate the behavior of the application-layer virtual session 183 and the programs 82, 84 running therein. This can be useful if application-layer virtual session 183 has been hijacked by a hacker or malware, but since the emulation can be computationally expensive, it may only be worthwhile in particularly high-security situations. Collector agent 86 may also be configured to monitor the behavior of application-layer virtual session 183 and to detect abnormal behavior as part of its collection of information.

Collector agent 119, operating as a module of dispatcher 112, may collect information at a cross-instance-level by monitoring encapsulated versions of the user commands referenced in connection with step 310, decapsulating the received encapsulated commands, and extracting specific types of commands from the decapsulated received encapsulated commands. Since collector agent 119 runs at the level of the VM server application 110, the user commands that it receives may still be encapsulated within remote protocol packets, such as, for example, xrdp packets. Thus, before collector agent 119 can extract the specific types of commands, collector agent 119 may need to decapsulate the user commands referenced in connection with step 310 from the encapsulated versions. In some embodiments, collector agent 119 may be configured to collect the same data as collected by collector agents 86, 185, such as timed user action sequences and timed user keystroke sequences. In order to acquire this data, collector agent 86 may need to both decapsulate data and emulate the behavior of the application-layer virtual session 183, as described above. This can be useful if a VM instance 181 has been hijacked by a hacker or malware, but since the decapsulation and emulation can be computationally expensive, it may only be worthwhile in particularly high-security situations. Collector agent 119 may also be configured to monitor the behavior of VM instance 181 and to detect abnormal behavior as part of its collection of information.

Collector agent 89, running as a module of security gateway application 137 or as a program on separate security gateway 37, may collect information above the level of the VM server application 110. For example, collector agent 89 may detect whether multiple concurrently-running VM instances 181 are associated with the same user account, which may be indicative of foul play, such as malware or hacking. In addition, collector agent 89 may also collect data regarding attempts by the VM server application 110 to access blacklisted resources.

It should be understood that although several of the collector agents 86, 89, 119, 185 may be configured to collect some of the same information as each other, more than one of these collector agents 86, 89, 119, 185 may run within a particular embodiment. In such cases, the redundancy may be useful for purposes of detecting hijacked layers and correlating data between layers. Thus, various embodiments are contemplated in which every combination of the collector agents 86, 89, 119, 185 are set up.

Returning to the general description of method 300 in FIG. 4, in step 340, VM server computer 80 asynchronously sends the collected information to behavioral analysis server 40 to be analyzed for anomalous user behavior, which may result in a recommendation that the system perform an additional authentication of the user, e.g., using second-factor authentication. Any collector agent 86, 89, 119, 185 which collected information is able to send the collected information to the behavioral analysis server 40 using an object data exchange protocol or service, such as, for example, SOAP, Java Message Service, Representational state transfer, or the Advanced Message Queuing Protocol, which are all well-known in the art.

FIG. 5 depicts an example method 400 performed by behavioral analysis server 40. In step 410, the behavioral analysis server 40 sets up and maintains a plurality of remote session connections 210, each remote session connection 210 representing a connection to a distinct remote collector agent 54, 72, 74, 86, 89, 90, 119, 185. It should be understood that, in various embodiments, any two or more of collector agent 54, 72, 74, 86, 89, 90, 119, 185 may be set up to communicate with behavioral analysis server 40 over remote session connections 210 using an object data exchange protocol or service, such as, for example, SOAP, Java Message Service, Representational state transfer, or the Advanced Message Queuing Protocol, which are all well-known in the art. Operation of collector agents 86, 89, 119, 185 has already been described.

Collector agent 54 may be configured to collect information about the configuration of the client machine 32 and send it to the behavioral analysis server 40. For example, the collected configuration information may include an indication of what network transport ports are open on the client machine 32, what software is installed on the client machine 32, what hardware is connected to the client machine 32, and what processes are running on the client machine 32. This information can be helpful in ascertaining whether the client machine 32 has been hijacked.

Collector agent 72 may be configured to collect low-level information about the packets passing through the gateway 36 and send it to the behavioral analysis server 40. For example, the collected information may include information such as packet sizes, routing data, and latencies. This information may be useful in detecting improper proxies.

Collector agent 74 may be configured to collect data regarding filtered files on the content filter server 78 and send it to the behavioral analysis server 40. For example, the collected information may include information such as file type, file size, and whether any malware was filtered from a file.

Collector agent 90 may be configured to collect data used by the application 88 and send it to the behavioral analysis server 40. For example, the collected information may include transaction details. This information may be useful in correlating with information sent by the other collector agents 54, 72, 74, 86, 89, 119, 185 for consistency.

Returning to the general description of method 400 in FIG. 5, in step 420, behavioral analysis server 40 executes behavioral analysis program 208, the behavioral analysis program 208 receiving data from two or more remote collector agents 54, 72, 74, 86, 89, 90, 119, 185 over the plurality of remote session connections 210 and performing risk-based analysis on the received data using historical risk data previously collected, for example using RSA Adaptive Authentication.

In step 430, behavioral analysis program 208 adaptively modifies the historical risk data based on the received data using machine-learning techniques for use in future authentication, as is done by RSA Adaptive Authentication.

In step 440, behavioral analysis program 208 sends results of the risk-based analysis to the application server 38 for further processing. In one embodiment, if risky user behavior is detected, application 88, running on application server 38, blocks the user from any further interaction with the application 88. In another embodiment, if risky user behavior is detected, application 88, running on application server 38, is configured to require the user to authenticate with an authentication server in order to re-confirm the user's identity. In yet another embodiment, if risky user behavior is detected, application 88, running on application server 38, is configured to log the risky behavior in an audit log, the audit log being periodically checked by a system administrator to evaluate whether any user accounts have been compromised.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible non-transitory computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of operating a virtual machine (VM) server computer comprising:
   executing a VM instance at the VM server computer, the VM instance having a remote display within a terminal program of a remote client computer, the terminal program being configured to send commands received by the client computer from a user to the VM server computer to affect operation of the VM instance;
   running a web browser within the VM instance, the web browser having a connection to a secure web application running on a web application server, the commands sent from the terminal program to the VM server computer allowing the user to interact with the secure web application via the terminal program and the web browser running on the VM instance;
   at the VM server computer, asynchronously collecting information in connection with the commands sent from the user to the VM server computer; and
   at the VM server computer, asynchronously sending the collected information to an analysis server to be analyzed for anomalous behavior by the user;
wherein collecting information in connection with the commands sent from the user to the VM server computer includes:

receiving cursor data provided by the terminal program of the remote client computer, the cursor data indicating when and where the user clicked and hovered a cursor within the terminal program; and extracting, from the cursor data, timed user action sequences in response to the web browser displaying particular web pages, the timed user action sequences enabling the analysis server to perform bio-rhythm analysis and vitality detection analysis.

2. The method of claim 1 wherein:

running the web browser within the VM instance includes executing the web browser in connection with an application-layer virtual session of the VM instance; and collecting information includes operating a collector agent in connection with the application-layer virtual session, the collector agent being configured to:

monitor communications received by the application-layer virtual session by performing the step of receiving cursor data; and extract specific types of information from the monitored communications, wherein extracting specific types of information from the monitored communications includes performing the step of extracting, from the cursor data, timed user action sequences in response to the web browser displaying particular web pages.

3. The method of claim 2 wherein collecting information further includes operating another collector agent as a module of the VM instance, the other collector agent being configured to:

monitor received commands sent from the user to the VM server computer; and extract specific types of commands from the received commands.

4. The method of claim 3 wherein collecting information further includes operating a third collector agent at the VM server computer, the third collector agent being configured to:

monitor received encapsulated commands sent from the user to the VM server computer;

decapsulate the received encapsulated commands; and extract specific types of commands from the decapsulated received encapsulated commands.

5. The method of claim 2 wherein:

the collector agent is further configured to capture rendered web pages produced by the web browser when the user clicks within the terminal; and extracting specific types of information from the monitored communications further includes extracting the timed user action sequences from the captured rendered web pages.

6. The method of claim 2 wherein:

the method further includes executing a virtual keyboard application within the VM instance in connection with the application-layer virtual session, wherein executing the virtual keyboard application includes:

causing a virtualized keyboard to be displayed within the remote display within the terminal program of the remote client computer;

receiving user click coordinates over particular keys of the virtualized keyboard;

converting the user click coordinates into keystrokes associated with the particular keys; and sending the keystrokes to the web browser; and extracting specific types of information from the monitored communications further includes extracting, from the cursor data and the converted keystrokes, timed user keystroke sequences, the timed user keystroke sequences further enabling the analysis server to perform the bio-rhythm analysis and the vitality detection analysis.

7. The method of claim 1 wherein collecting information in connection with the commands sent from the user to the VM server computer further includes collecting data that represents actions taken by the user in interacting with the secure web application.

8. A VM server computer apparatus comprising:

a network interface;

memory; and a controller, the controller being configured to perform the method of claim 1.

9. A method of operating a virtual machine (VM) server computer, the method comprising:

executing a VM instance at the VM server computer, the VM instance having a remote display within a terminal program of a remote client computer, the terminal program being configured to send commands received by the client computer from a user to the VM server computer to affect operation of the VM instance;

running a web browser within the VM instance, the web browser having a connection to a secure web application running on a web application server, the commands sent from the terminal program to the VM server computer allowing the user to interact with the secure web application via the terminal program and the web browser running on the VM instance;

at the VM server computer, asynchronously collecting information in connection with the commands sent from the user to the VM server computer;

at the VM server computer, asynchronously sending the collected information to an analysis server to be analyzed for anomalous behavior by the user; and running a security gateway application on the VM server computer, the security gateway application being configured to limit access by the VM instance to the secure web application according to a set of rules;

wherein collecting information includes operating a collector agent as a module of the security gateway application, the collector agent being configured to detect whether the VM instance is associated with a user account that is also associated with another concurrently-running VM instance.

10. The method of claim 9 wherein collecting information includes operating another collector agent as a module of the VM instance, the other collector agent being configured to:

monitor received commands sent from the user to the VM server computer; and extract specific types of commands from the received commands.

11. A computer program product comprising a non-transitory computer-readable storage medium storing instructions, which, when executed by a computer, cause the computer to perform the operations of:

executing a VM instance at the computer, the VM instance having a remote display within a terminal program of a remote client computer, the terminal program being configured to send commands received by the client computer from a user to the computer to affect operation of the VM instance;

running a web browser within the VM instance, the web browser having a connection to a secure web application running on a web application server, the commands sent from the terminal program to the computer allowing the user to interact with the secure web application via the terminal program and the web browser running on the VM instance;

asynchronously collecting information in connection with the commands sent from the user to the computer;

asynchronously sending the collected information to an analysis server to be analyzed for anomalous behavior by the user; and running a security gateway application, the security gateway application being configured to limit access by the VM instance to the secure web application according to a set of rules;

wherein the instructions direct the computer to, when collecting information, operate a collector agent as a module of the security gateway application, the collector agent being configured to detect whether the VM instance is associated with a user account that is also associated with another concurrently-running VM instance.

12. The computer program product of claim 11 wherein the instructions further direct the computer to, when collecting information, operate another collector agent as a module of the VM instance, the other collector agent being configured to:

monitor received commands sent from the user to the computer; and extract specific types of commands from the received commands.

13. The computer program product of claim 11 wherein the instructions direct the computer to:

when running the web browser within the VM instance, execute the web browser in connection with an application-layer virtual session of the VM instance; and when collecting information, operate another collector agent in connection with the application-layer virtual session, the other collector agent being configured to:

monitor communications received by the application-layer virtual session; and extract specific types of information from the monitored communications.

14. The computer program product of claim 13 wherein the instructions further direct the computer to, when collecting information, operate a third collector agent as a module of the VM instance, the third collector agent being configured to:

monitor received commands sent from the user to the computer; and extract specific types of commands from the received commands.

15. The computer program product of claim 14 wherein the instructions further direct the computer to, when collecting information, operate a fourth collector agent, the fourth collector agent being configured to:

monitor received encapsulated commands sent from the user to the computer;

decapsulate the received encapsulated commands; and extract specific types of commands from the decapsulated received encapsulated commands.

16. A system comprising:

a virtual machine (VM) server computer running a VM server application configured to execute a VM instance the VM instance having a remote display within a terminal program of a remote client computer, the terminal program being configured to send commands received by the client computer from a user to the VM server computer to affect operation of the VM instance;

an application server running a secure web application in communication with the VM server application; and an analysis server in communication with the VM server;

wherein the VM server application is configured to:

asynchronously collect information in connection with the commands sent from the user to the VM server computer; and asynchronously send the collected information to the analysis server to be analyzed for anomalous behavior by the user;

wherein the VM server application is configured to, when collecting information, operate a collector agent as a module of the VM instance, the collector agent being configured to:

monitor received commands sent from the user to the VM server computer; and extract specific types of commands from the received commands;

wherein the analysis server is configured to:

maintain a remote session connection to each of a plurality of distinct remote collection agents, the plurality of remote collection agents including the collector agent operated as a module of the VM instance, the remote session connections each collecting usage data; and perform risk-based analysis of on the usage data collected from the plurality of remote collection agents in conjunction with historical risk data to assess a risk that that the user is an imposter based on behavioral patterns.

17. The system of claim 16 wherein the system further comprises a gateway machine interposing between the remote client computer and the VM server computer, wherein the gateway machine is configured to:

convert packets received from the remote client computer directed to the VM server computer from using a secure transport protocol to using a remote protocol; and operate another collector agent on the gateway machine, the other collector agent being configured to asynchronously:

monitor the packets received from the remote client computer at a network-level; and extract specific types of network-level data from the monitored packets; and send the extracted network-level data to the analysis server to be analyzed for anomalous behavior by the user.

18. The system of claim 16 wherein the system further comprises a drop server in communication with the remote client computer and a content filter server in communication with the drop server and the VM server computer, wherein the content filter server is configured to:

periodically pull files sent from the remote client computer to the drop server;

scan the pulled files for security alerts; and operate another collector agent on the content filter server, the other collector agent being configured to asynchronously:

monitor for security alerts; and send the security alerts to the analysis server to be analyzed for anomalous behavior by the user.

19. The system of claim 16 wherein the system further comprises the remote client computer, wherein the remote client computer is configured to operate another collector agent on the remote client computer, the other collector agent being configured to asynchronously:

collect information about the configuration of the remote client computer; and send the collected information about the configuration of the remote client computer to the analysis server to be analyzed for anomalous behavior by the user.

20. The system of claim 16 wherein the system further comprises a security gateway server computer interposing between the VM server computer and the application server, wherein the security gateway server computer is configured to:
   limit access by the VM instance to the secure web application according to a set of rules; and
   operate another collector agent on the security gateway server computer, the other collector agent being configured to asynchronously:
      collect information in connection with communications sent from the VM server computer to the secure web application, wherein collecting the information in connection with the communications sent from the VM server computer to the secure web application includes:
         detecting whether the VM instance is associated with a user account that is also associated with another concurrently-running VM instance; and
         detecting attempted accesses by the VM instance to the secure web application that were limited according to the set of rules; and
      send the information collected in connection with the communications to the analysis server to be analyzed for anomalous behavior by the user.

21. The system of claim 16 wherein the analysis server is configured to send data regarding anomalous behavior by the user to the application server for further processing by the application server in response to the anomalous behavior.

* * * * *